(12) United States Patent
Yu

(10) Patent No.: US 11,056,798 B2
(45) Date of Patent: Jul. 6, 2021

(54) BEAM ADJUSTABLE ANTENNA DEVICE

(71) Applicant: DELTA ELECTRONICS, INC., Taoyuan (TW)

(72) Inventor: Han-Hsuan Yu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 53 days.

(21) Appl. No.: 16/532,232

(22) Filed: Aug. 5, 2019

(65) Prior Publication Data
US 2020/0235486 A1    Jul. 23, 2020

(30) Foreign Application Priority Data
Jan. 22, 2019   (CN) .......................... 201910059245.4

(51) Int. Cl.
| | | |
|---|---|---|
| *H01Q 19/18* | (2006.01) | |
| *H01Q 15/14* | (2006.01) | |
| *H01Q 5/30* | (2015.01) | |
| *H01Q 3/24* | (2006.01) | |
| *H01Q 19/185* | (2006.01) | |

(52) U.S. Cl.
CPC ............. *H01Q 19/185* (2013.01); *H01Q 5/30* (2015.01)

(58) Field of Classification Search
CPC ...... H01Q 19/185; H01Q 15/148; H01Q 5/30; H01Q 5/307; H01Q 5/35; H01Q 19/10; H01Q 19/18; H01Q 15/14; H01Q 3/24; H01Q 3/242; H01Q 5/00; H01Q 5/28
See application file for complete search history.

(56) References Cited

U.S. PATENT DOCUMENTS

| | | | |
|---|---|---|---|
| 6,426,722 B1 * | 7/2002 | Sievenpiper | H01Q 15/10 343/700 MS |
| 7,245,269 B2 * | 7/2007 | Sievenpiper | H01Q 3/46 343/700 MS |
| 9,263,798 B1 | 2/2016 | Piazza et al. | |
| 10,819,030 B2 * | 10/2020 | Cheng | H01Q 9/045 |
| 2003/0193446 A1 | 10/2003 | Chen | |

(Continued)

FOREIGN PATENT DOCUMENTS

| | | |
|---|---|---|
| TW | 201330380 A | 7/2013 |
| TW | 201539866 A | 10/2015 |

OTHER PUBLICATIONS

Taiwan Office Action with Search Report cited in its corresponding TW application No. 108102325 dated Jan. 9, 2020.

*Primary Examiner* — Thai Pham
(74) *Attorney, Agent, or Firm* — Muncy, Geissler, Olds & Lowe, P.C.

(57) ABSTRACT

A beam adjustable antenna device includes a dual-band antenna, a first reflection unit, and a second reflection unit. The dual-band antenna radiates or receives a signal on a first frequency or a second frequency. The first reflection unit has a plurality of first reflection boards to reflect the signal on the first frequency from the dual-band antenna. The second reflection unit has a plurality of second reflection boards to reflect an signal on the second frequency radiated from the dual-band antenna. The plurality of first and second reflection boards are arranged beside the dual-band antenna, and a plane normal vector of each first and second reflection board is directed to the dual-band antenna. The first reflection unit is closer to the dual-band antenna than the second reflection unit.

12 Claims, 13 Drawing Sheets

(56) References Cited

U.S. PATENT DOCUMENTS

| | | | |
|---|---|---|---|
| 2014/0062822 A1* | 3/2014 | Tseng | H01Q 21/26 343/798 |
| 2015/0263423 A1* | 9/2015 | Park | H01Q 1/521 342/374 |

* cited by examiner

BEAM ADJUSTABLE ANTENNA DEVICE

CROSS REFERENCE TO RELATED APPLICATIONS

This application claims priority of China Patent Application No. 201910059245.4, filed on Jan. 22, 2019, the entirety of which is incorporated by reference herein.

FIELD OF THE PRESENT INVENTION

The present invention relates to an antenna device, and especially to a beam adjustable antenna device.

DESCRIPTION OF THE RELATED ART

With the rapid development of wireless communication and the rapid increase in multimedia information exchange, the next generation of wireless communication technology has to meet certain requirements, including high-speed, high-capacity, high-quality and high-elasticity. These properties are needed for use in a highly efficient spectrum application technology, wherein the spectrum is an increasingly valuable resource. In a conventional wireless router, a common antenna application is a Multi-input Multi-output (MIMO) system, which covers the entire applied environment by using multiple omnidirectional antennas, or using a directional antenna for a directional-use environment.

The main difference between a beam adjustable antenna and a traditional antenna is that the antenna beam field and the stability of energy transmission intensity for the beam adjustable antenna can be switched in accordance with the position of the user. The feature described above for the beam adjustable antenna is a mechanism for making full use of resources for signal quality improvement, interference suppression, and adaptive beam adjustment. The initial operation mode is to increase a signal-to-noise ratio (SNR) by using an antenna gain from array antennas. In order to improve robustness to the multipath fading phenomenon of the wireless channel, the array antennas can also be used for spatial diversity to obtain a diversity gain. However, array antennas tend to be bulky.

Another method is to use beam forming technology for signal directivity, using an algorithm with a self-adaptation and adjustment function to drive the array antenna to generate a specific beam shape, aligning the main beam with the target signal for enhanced reception, and aligning a null point with the interference signal to suppress interference.

Most recent beam adjustable antennas use a plurality of antennas as a switching mechanism to change the overall radiation pattern by switching among different antennas therein, but the structure is extremely complicated and the volume is correspondingly larger. It takes too much space to form an antenna unit.

BRIEF SUMMARY OF THE PRESENT INVENTION

In order to resolve the issue described above, the present invention discloses a beam adjustable antenna device, comprising a dual-band antenna, a first reflection unit, and a second reflection unit. The dual-band antenna radiates or receives a signal on a first frequency or a second frequency, and the first frequency is higher than the second frequency. The first reflection unit has a plurality of first reflection boards to reflect the signal on the first frequency from the dual-band antenna. The second reflection unit has a plurality of second reflection boards to reflect the signal on the second frequency from the dual-band antenna; wherein the first reflection unit is closer to the dual-band antenna than the second reflection unit. The plurality of first and second reflection boards are arranged beside the dual-band antenna, and a plane normal vector of each first and second reflection board is directed to the dual-band antenna.

According to the beam adjustable antenna device disclosed above, the dual-band antenna is arranged on a baseboard; the baseboard is arranged between two of the plurality of the first reflection boards, and plane normal vectors of the two of the plurality of the first reflection boards are orthogonal to that of the baseboard; other first reflection boards are arranged on one side of the baseboard.

According to the beam adjustable antenna device disclosed above, the distance between the two of the plurality of the first reflection boards and the baseboard is one-eighth to one-quarter of the wavelength of the signal on the first frequency.

According to the beam adjustable antenna device disclosed above, the two of the plurality of the first reflection boards are an a-th reflection board and a b-th reflection board; the other first reflection boards are a c-th reflection board and a d-th reflection board; the distance between the center of each c-th and d-th reflection boards and the first plane extending from the baseboard is one-eighth to one-quarter of the wavelength of the signal on the first frequency.

According to the beam adjustable antenna device disclosed above, the angle between the plane normal vector of the c-th reflection board and the first plane is under a range of 55 to 65 degrees, and the angle between the plane normal vector of the d-th reflection board and the first plane is under a range of 115 to 125 degrees.

According to the beam adjustable antenna device disclosed above, the baseboard and the two of the plurality of the first reflection boards are arranged between two of the plurality of the second reflection boards, and plane normal vectors of the two of the plurality of the second reflection boards are orthogonal to that of the baseboard; other second reflection boards are arranged on one side of the baseboard.

According to the beam adjustable antenna device disclosed above, the distance between the two of the plurality of the second reflection boards and the baseboard is one-eighth to one-quarter of the wavelength of the signal on the second frequency.

According to the beam adjustable antenna device disclosed above, the two of the plurality of the second reflection boards are an e-th reflection board and an f-th reflection board; the other second reflection boards are a g-th reflection board, an h-th reflection board, an i-th reflection board, and a j-th reflection board; the distance between the center of each g-th, h-th, i-th, and j-th reflection boards and the first plane extending from the baseboard is one-eighth to one-quarter of the wavelength of the signal on the second frequency.

According to the beam adjustable antenna device disclosed above, the angle between the plane normal vector of the g-th reflection board and the first plane is under a range of 45 to 55 degrees, and the angle between the plane normal vector of the h-th reflection board and the first plane is under a range of 115 to 125 degrees; the angle between the plane normal vector of the i-th reflection board and the first plane is under a range of 78 to 88 degrees; and the angle between the plane normal vector of the j-th reflection board and the first plane is under a range of 92 to 102 degrees.

According to the beam adjustable antenna device disclosed above, each of the first and second reflection boards is coupled to a respective switch; when the switch is turned on, either the first or second reflection board corresponding to the switch is grounded, so that the beam field of the dual-band antenna corresponding to the first frequency or the second frequency is changed.

According to the beam adjustable antenna device disclosed above, the dual-band antenna comprises an inverted-F antenna (PIFA), a loop antenna, and an open loop antenna.

According to the beam adjustable antenna device disclosed above, the dual-band antenna comprises a radiation part for the first frequency and a radiation part for the second frequency, and is orthogonal to a second plane; the height from the radiation part for the second frequency to the second plane is greater than the height from the radiation part for the first frequency to the second plane.

According to the beam adjustable antenna device disclosed above, the first and second reflection units are both orthogonal to the second plane; the height of the first reflection unit to the second plane is identical to the height from the radiation part for the first frequency to the second plane; the height of the second reflection unit to the second plane is identical to the height from the radiation part for the second frequency to the second plane.

DETAILED DESCRIPTION OF THE PRESENT INVENTION

The present invention can be more fully understood by reading the subsequent detailed description with references made to the accompanying figures.

It should be understood that the figures are not drawn to scale in accordance with standard practice in the industry. In fact, it is allowed to arbitrarily enlarge or reduce the size of devices for clear illustration.

Figure 1A:
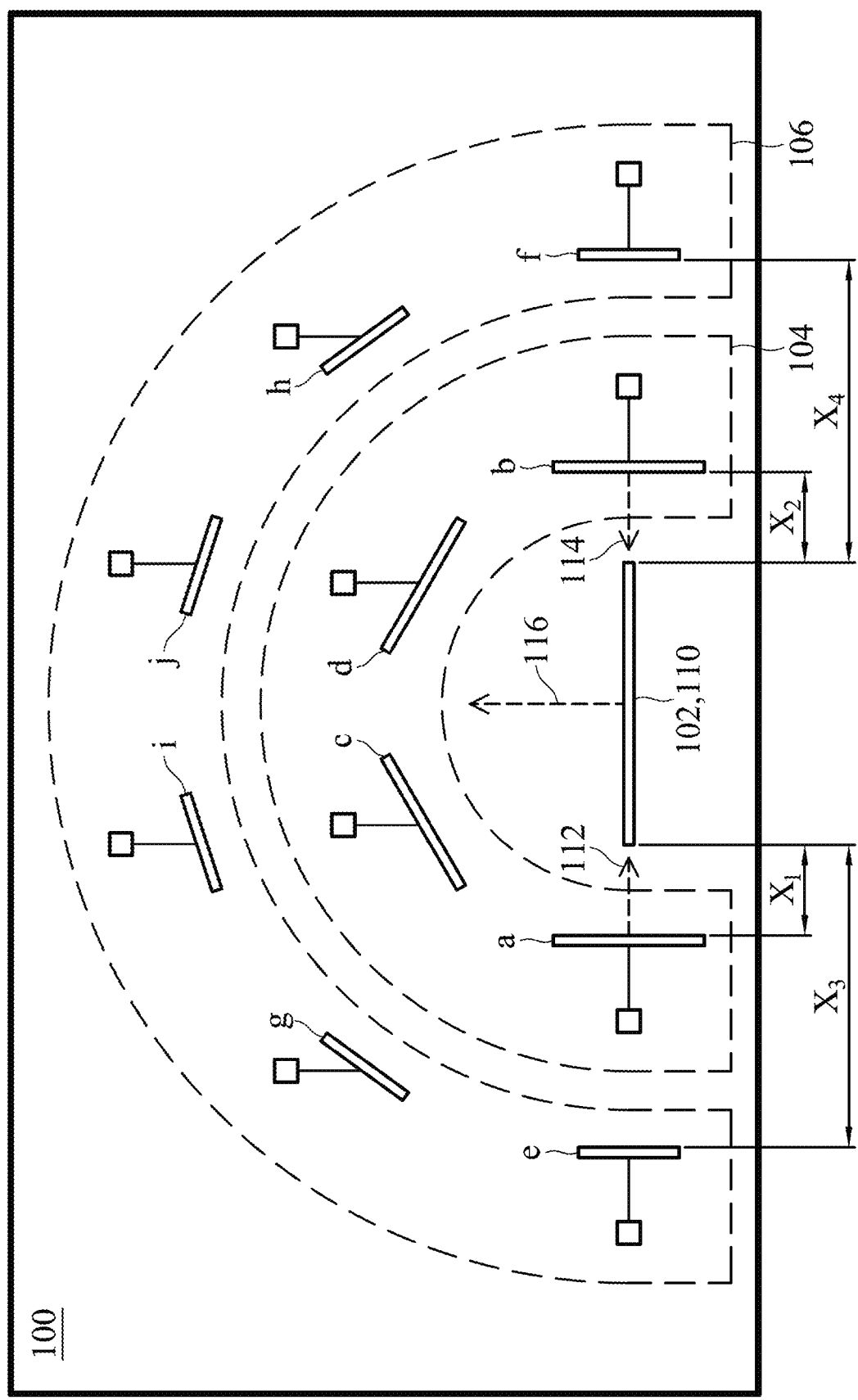
FIG. 1A and FIG. 1B are a top view diagram and a reflection board distance configuration diagram of a beam adjustable antenna device in accordance with an embodiment of the disclosure.
Figure 1B:
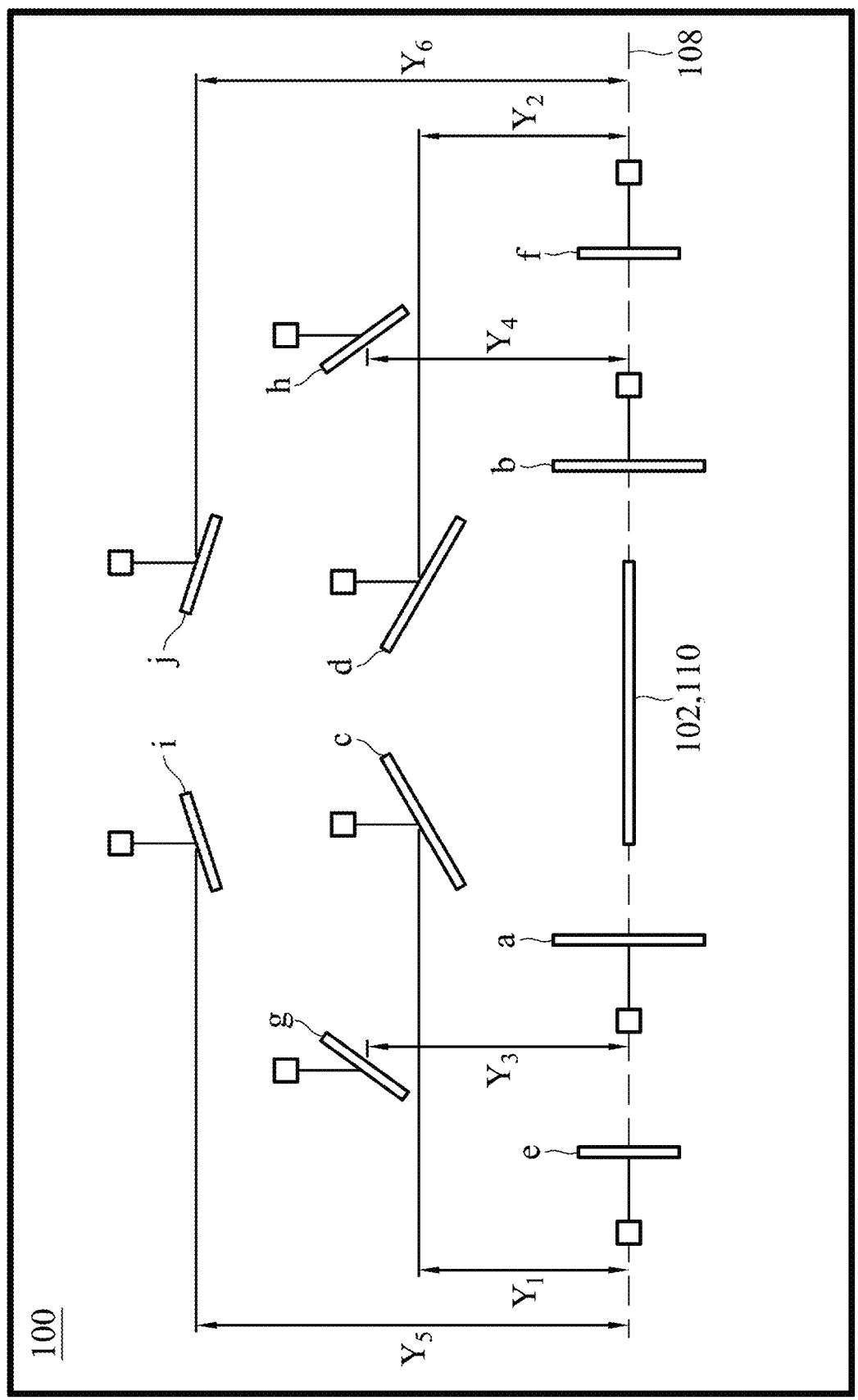

FIG. 1A and FIG. 1B are a top view diagram and a reflection board distance configuration diagram of a beam adjustable antenna device in accordance with an embodiment of the disclosure. As shown in FIG. 1A, a beam adjustable antenna device 100 includes a dual-band antenna 102, a first reflection unit 104, and a second reflection unit 106. The dual-band antenna 102 radiates or receives a signal on a first frequency ($f_1$) or a second frequency ($f_2$). In an embodiment, the first frequency ($f_1$) is 5 GHz, and the second frequency (k) is 2.4 GHz, which are both application bands of Wi-Fi. In the embodiment, the dual-band antenna 102 includes an inverted-F antenna (PIFA), a loop antenna, and an open loop antenna. Generally, the dual-band antenna 102 is an omnidirectional antenna.

The first reflection unit 104 has a plurality of first reflection boards to reflect the signal on the first frequency ($f_1$) from the dual-band antenna 102. The second reflection unit 106 has a plurality of second reflection boards to reflect the signal on the second frequency ($f_1$) from the dual-band antenna 102. The plurality of first and second reflection boards are arranged beside the dual-band antenna 102, and a plane normal vector of each first and second reflection board is directed to the dual-band antenna 102. In the embodiment, the dual-band antenna 102 is formed on a baseboard 110, and the baseboard 110 is arranged between two of the plurality of the of the first reflection boards, and the plane normal vectors of the two of the plurality of the first reflection boards (such as normal vectors 112 and 114 in FIG. 1A) are orthogonal to that of the baseboard (such as a normal vector 116). Other first reflection boards are arranged on one side of the baseboard 110.

The baseboard 110 and the two of the plurality of the first reflection boards are arranged between two of the plurality of the second reflection boards, and the plane normal vectors of the two of the plurality of the second reflection boards are orthogonal to that of the baseboard 110. Other second reflection boards are arranged on one side of the baseboard 110. In the embodiment, as shown in FIG. 1A, the two of the plurality of the first reflection boards are a reflection board a and a reflection board b. The other first reflection boards are a reflection board c and a reflection board d. The two of the plurality of the second reflection boards are a reflection board e and a reflection board f. The other second reflection boards are a reflection board g, a reflection board h, a reflection board i, and a reflection board j. Distances $X_1$ and $X_2$ between the reflection boards a and b and the baseboard 110 of the dual-band antenna 102 is one-eighth to one-quarter of the wavelength of the signal on the first frequency ($f_2$), that is $\frac{1}{8}\lambda_1 \sim \frac{1}{4}\lambda_1$. Distances $X_3$ and $X_4$ between the reflection boards e and f and the baseboard 110 of the dual-band antenna 102 is one-eighth to one-quarter of the wavelength of the signal on the second frequency ($f_2$), that is $\frac{1}{8}\lambda_2 \sim \frac{1}{4}\lambda_2$.

The baseboard 110 can be an FR4 board, or other commonly used printed circuit board (PCB) board. The layout of the dual-band antenna 102 is arranged on the surface of the baseboard 110. One surface of each of the first and second reflection boards (reflection boards a~d and reflection boards e~j) has a metal layer, and the surface forming the metal layer is facing to the dual-band antenna 102. The plurality of first and second reflection boards can also be implemented using FR4 boards or other commonly used PCB board.

As shown in FIG. 1B, distances $Y_1$ and $Y_2$ between centers of reflection boards c, d and a first plane 108 extending from the baseboard 110 of the dual-band antenna 102 is one-eighth to one-quarter of the wavelength of the signal on the first frequency ($f_2$), that is $\frac{1}{8}\lambda_1 \sim \frac{1}{4}\lambda_1$. Distances $Y_3$, $Y_4$, $Y_5$ and $Y_6$ between centers of reflection boards g~j and a first plane 108 extending from the baseboard 110 of the dual-band antenna 102 is one-eighth to one-quarter of the wavelength of the signal on the second frequency ($f_2$), that is $\frac{1}{8}\lambda_2 \sim \frac{1}{4}\lambda_2$. In the embodiment, $$\lambda_1 = \frac{C}{f_1} = \frac{3 \times 10^8}{5 \times 10^9} = 0.06$$

meters, and $$\lambda_2 = \frac{C}{f_2} = \frac{3 \times 10^8}{2.4 \times 10^9} = 0.125$$

meters. In the embodiment, $Y_3 < Y_5$ and $Y_4 < Y_6$. The first plane 108 is a plane on which the baseboard 110 of the dual-band antenna 102 is located, and since FIG. 1B is the top view diagram of the beam adjustable antenna device 100, the first plane 108 is presented as a straight line in FIG. 1B.

Figure 2A:
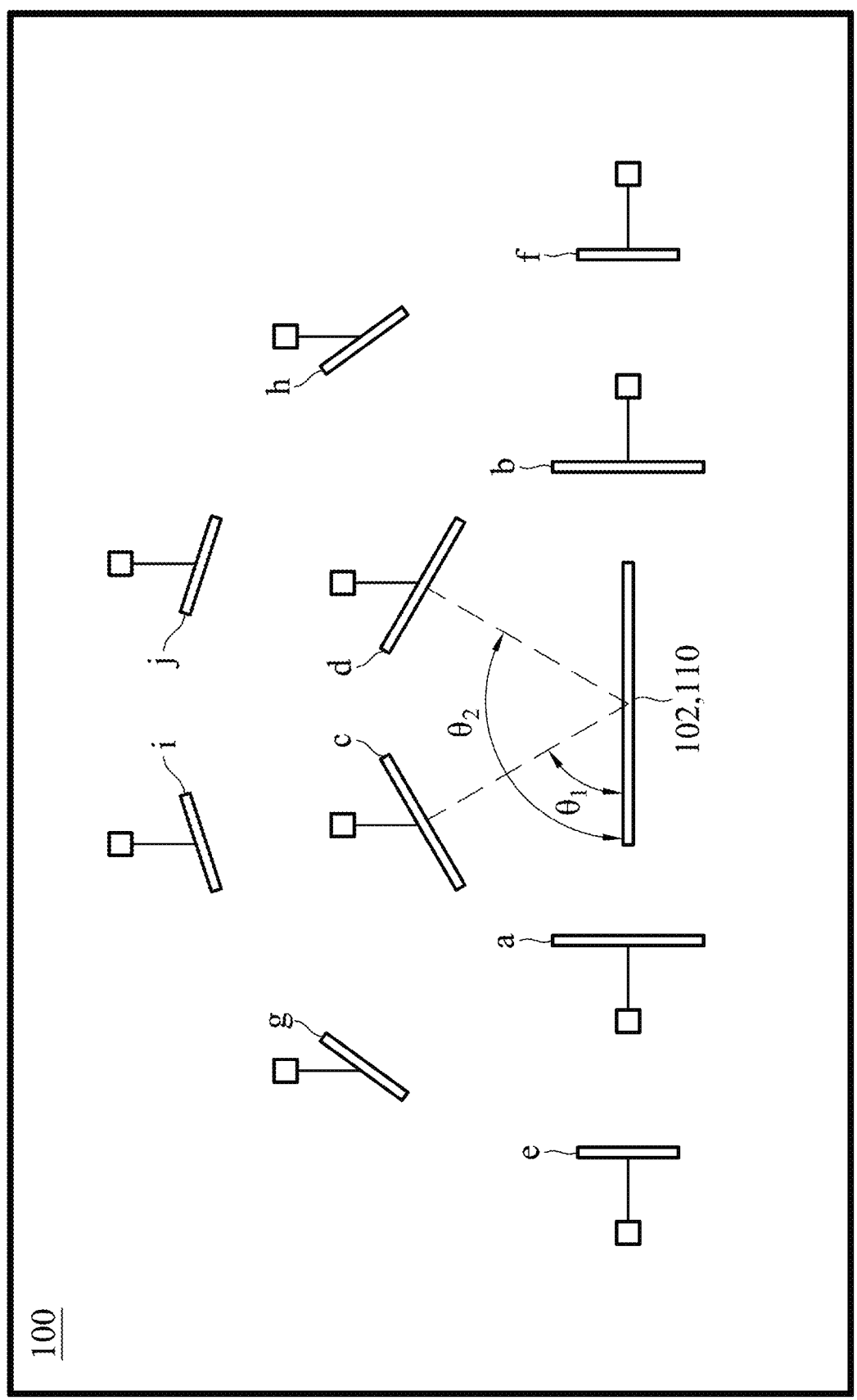
FIG. 2A and FIG. 2B are reflection board angle configuration diagrams in accordance with the embodiment of the disclosure.
Figure 2B:
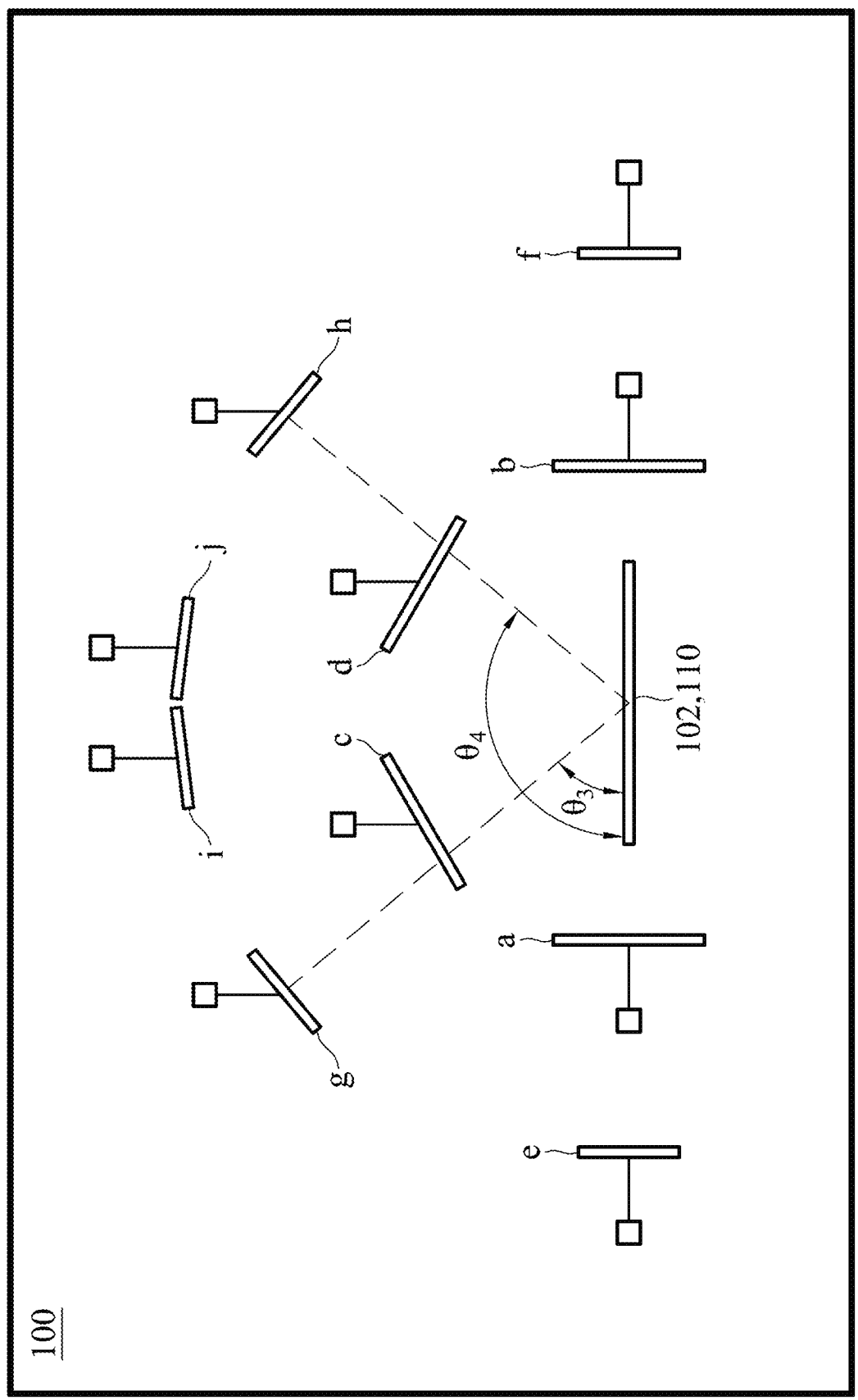

FIG. 2A and FIG. 2B are reflection board angle configuration diagrams in accordance with the embodiment of the disclosure. As shown in FIG. 2A, the angle ($\theta_1$) between the plane normal vector of the reflection board c and the first plane 108 is under a range of 55 to 65 degrees, and the angle ($\theta_2$) between the plane normal vector of the reflection board d and the first plane 108 is under a range of 115 to 125 degrees. As shown in FIG. 2B, the angle ($\theta_3$) between the plane normal vector of the reflection board g and the first plane 108 is under the range of 45 to 55 degrees, and the angle ($\theta_4$) between the plane normal vector of the reflection board h and the first plane is under the range of 115 to 125 degrees. The angle between the plane normal vector of the reflection board i and the first plane 108 is under a range of 78 to 88 degrees, and the angle between the plane normal vector of the reflection board j and the first plane 108 is under a range of 92 to 102 degrees.

Figure 3:
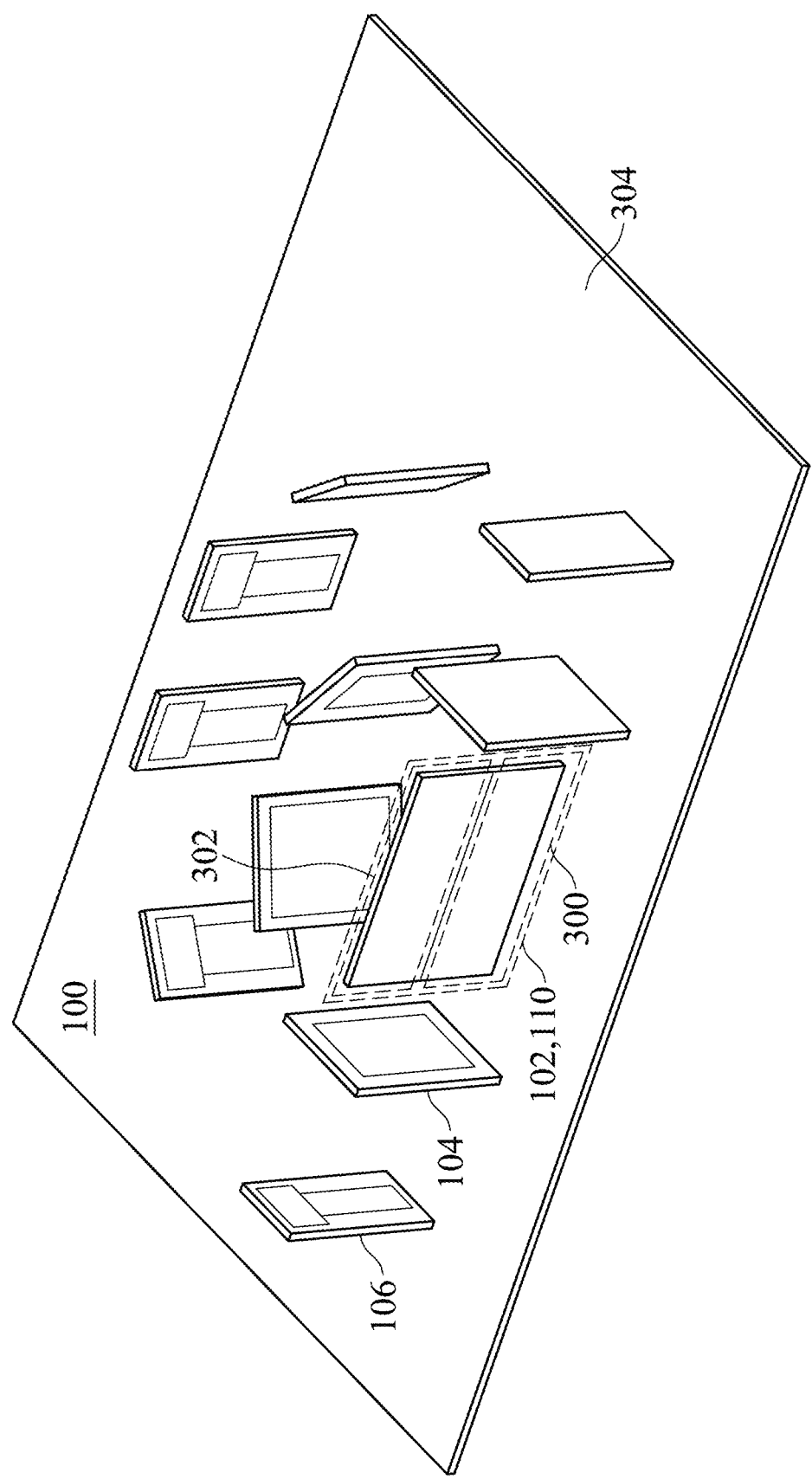
FIG. 3 is a stereogram of the beam adjustable antenna device in accordance with the embodiment of the disclosure.

FIG. 3 is a stereogram of the beam adjustable antenna device in accordance with the embodiment of the disclosure. FIG. 1A and FIG. 1B are the top view diagrams of the beam adjustable antenna device 100 in FIG. 3. As shown in FIG. 3, the dual-band antenna 102 includes a radiation part 300 for the first frequency and a radiation part 302 for the second frequency. The dual-band antenna 102 is orthogonal to a second plane 304. The height from the radiation part 302 for the second frequency to the second plane 304 is greater than the height from the radiation part 300 for the first frequency to the second plane 304. The first reflection unit 104 and the second reflection unit 106 are both orthogonal to the second plane 304. The height of the first reflection unit 104 to the second plane 304 is identical to the height from the radiation part 300 for the first frequency to the second plane 304. The height of the second reflection unit 106 to the second plane 304 is identical to the height from the radiation part 302 for the second frequency to the second plane 304. The second plane 304 is orthogonal to the first plane 108.

Furthermore, since the current path on the antenna body when the radiation part 302 for the second frequency of the dual-band antenna 102 is radiated is longer than the current path on the antenna body when the radiation part 300 for the first frequency is radiated, and the radiation part 300 for the first frequency and the radiation part 302 for the second frequency are both formed on the baseboard 110 of the dual-band antenna 102, the height from the radiation part 302 for the second frequency to the second plane 304 is greater than the height from the radiation part 300 for the first frequency to the second plane 304. In order to reflect a signal on the first frequency ($f_1$), the height of the first reflection unit 104 to the second plane 304 is identical to the height from the radiation part 300 for the first frequency to the second plane 304. In order to reflect a signal on the second frequency ($f_2$), the height of the second reflection unit 106 to the second plane 304 is identical to the height from the radiation part 302 for the second frequency to the second plane 304.

Figure 4A:
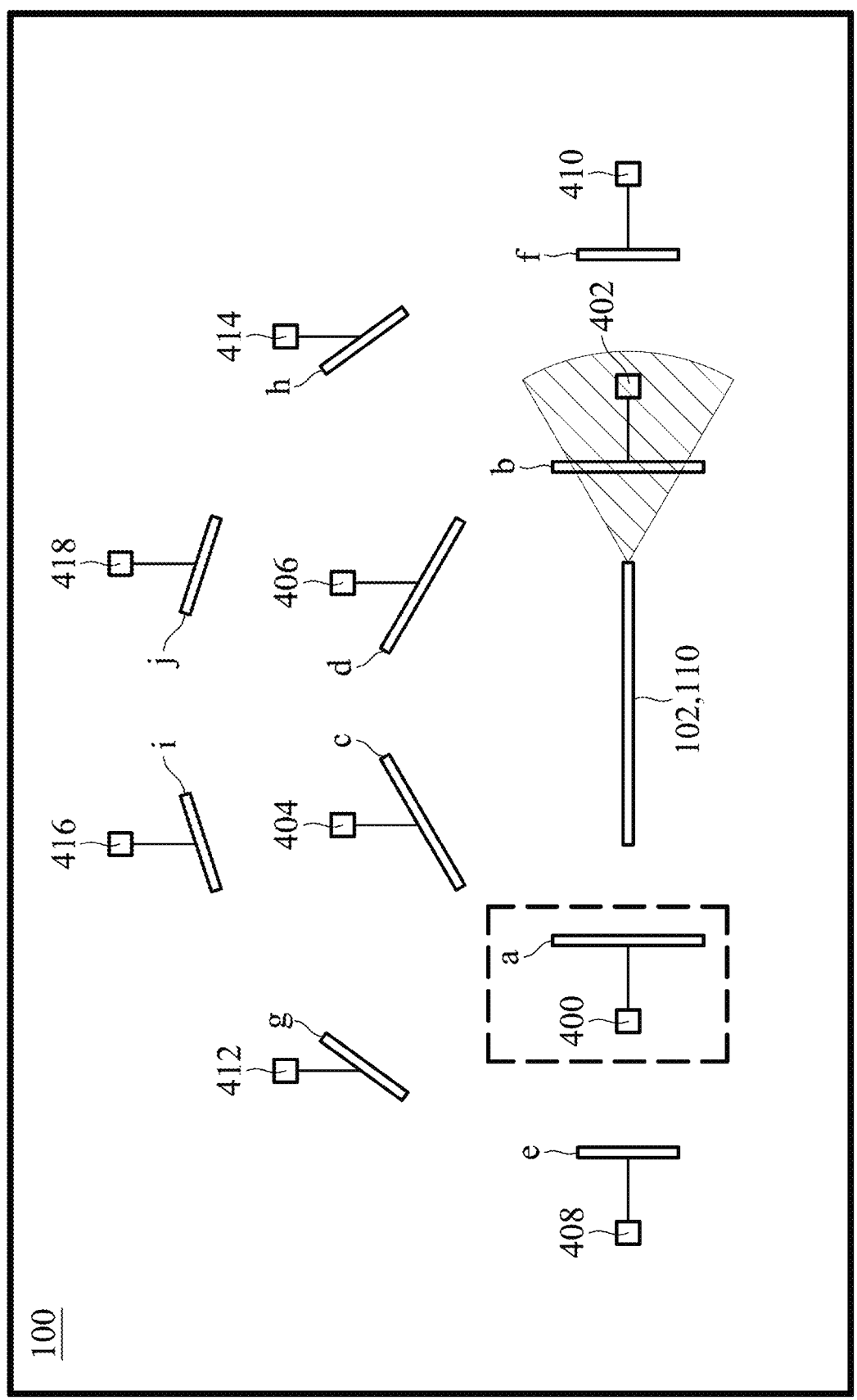
FIGS. 4A-4G are schematic diagrams of beam field variation corresponding to the beam adjustable antenna device switching switches in accordance with the embodiment of the disclosure.

Each of the first and second reflection boards is coupled to a respective switch. When the switch is turned on, either the first or second reflection board corresponding to the switch is grounded, so that the beam field of the dual-band antenna 102 corresponding to the first frequency ($f_1$) or the second frequency ($f_2$) is changed. FIGS. 4A-4G are schematic diagrams of beam field variation corresponding to beam adjustable antenna device switching switches in accordance with the embodiment of the disclosure. As shown in FIG. 4A, reflection board a is coupled to switch 400, reflection board b is coupled to switch 402, reflection board c is coupled to switch 404, and reflection board d is coupled to switch 406. Furthermore, reflection board e is coupled to switch 408, reflection board f is coupled to switch 410, reflection board g is coupled to switch 412, reflection board h is coupled to switch 414, reflection board i is coupled to switch 416, and reflection board j is couples to switch 418.

For example, since the dual-band antenna 102 is an omnidirectional antenna, there is no obvious directivity. When the switches 400~418 are all turned off, the beam field of the dual-band antenna 102 is approximately similar to a spherical shape. In the embodiment, the first frequency ($f_1$) is used as an example. When the switch 400 is turned on, the reflection board a is grounded, so that the refection board a is approximated to a perfect electric conductor (PEC) in electromagnetic boundary conditions, thus reflecting the beam field of the dual-band antenna 102 in an opposite direction, which is the direction of reflection board b. In brief, when the switch 400 is turned on, the reflection board a reflects the beam field of the dual-band antenna 102 in the direction of reflection board b. In addition, the switches 402~418 are not turned on, so the reflection boards b~d and e~j are floating, and do not influence the beam field of the dual-band antenna 102.

Figure 4B:
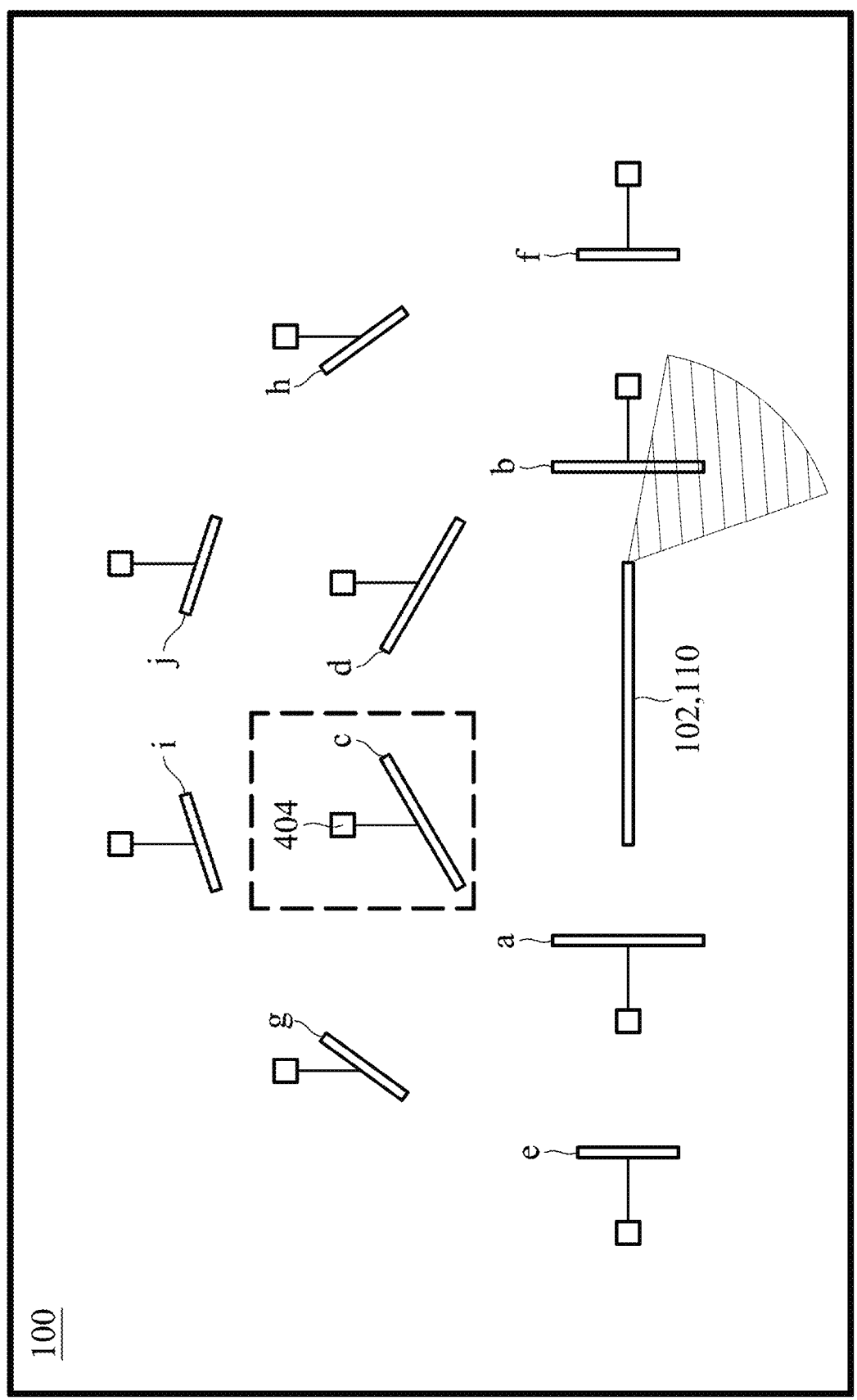
Figure 4C:
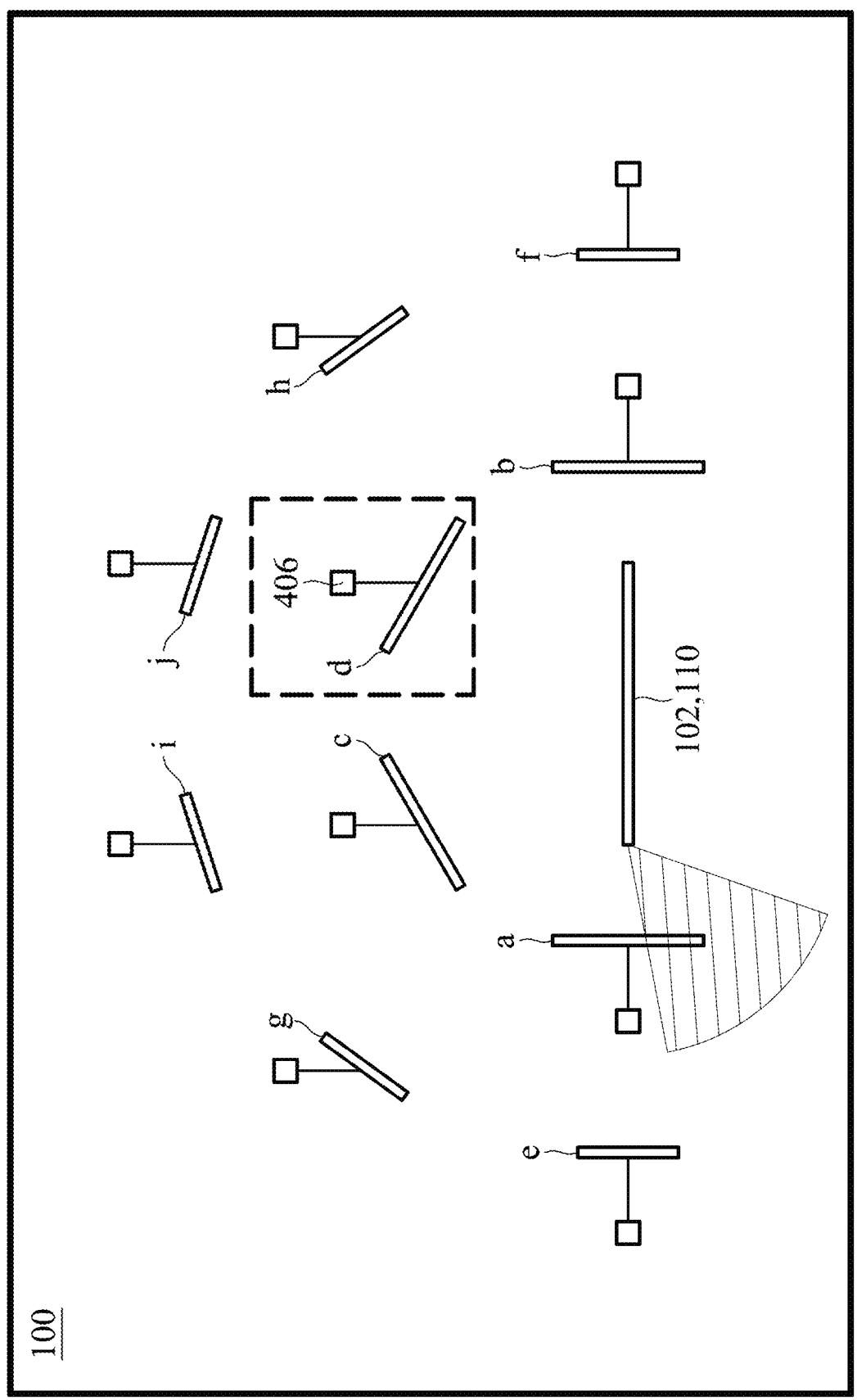
Figure 4D:
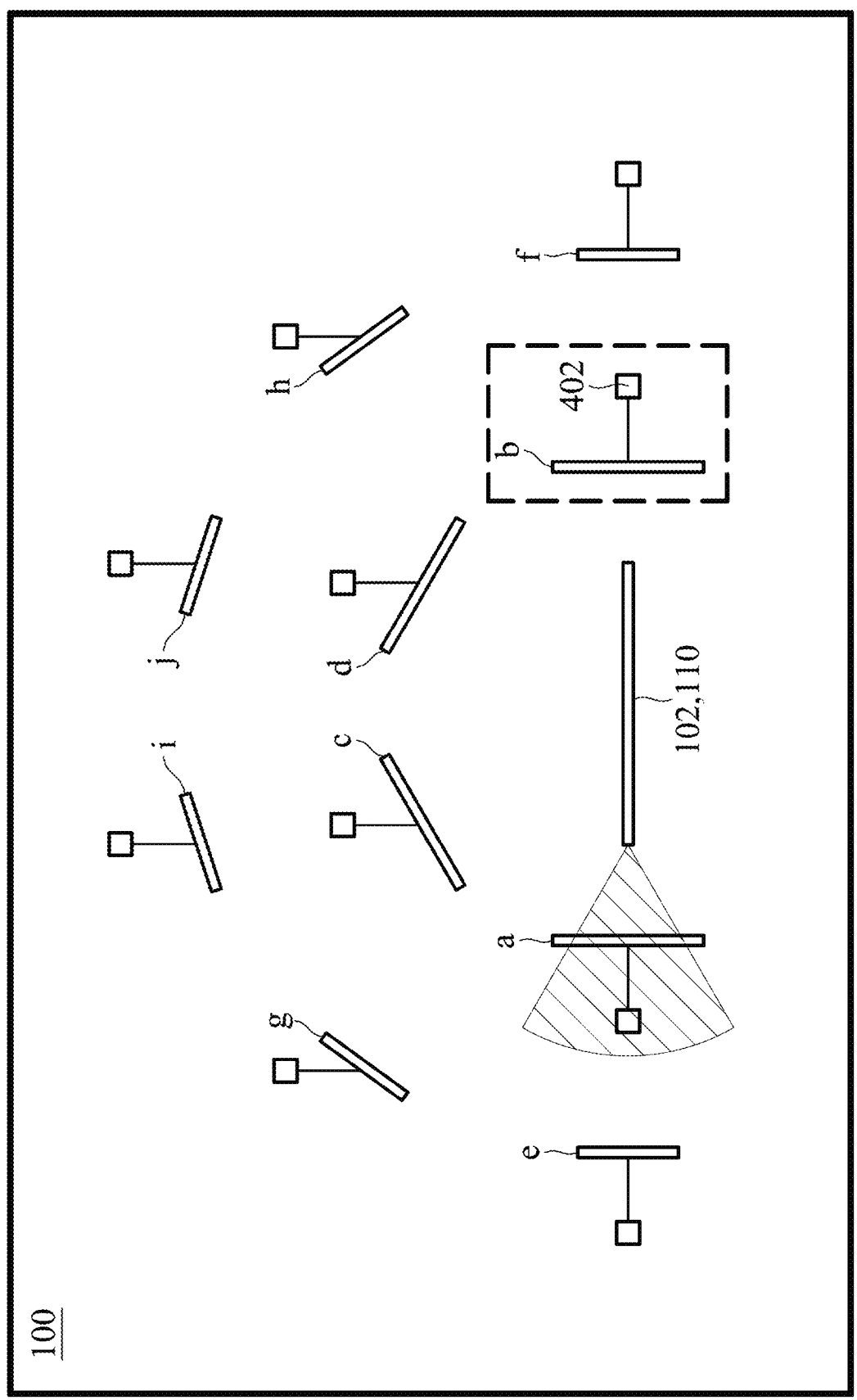

As shown in FIG. 4B, when the switch 404 is turned on, the reflection board c is grounded to reflect the beam field of the dual-band antenna 102 toward the direction between the reflection board b and the other side of the baseboard 110 of the dual-band antenna 102. As shown in FIG. 4C, when the switch 406 is turned on, the reflection board d is grounded to reflect the beam field of the dual-band antenna 102 toward the direction between the reflection board a and the other side of the baseboard 110 of the dual-band antenna 102. As shown in FIG. 4D, when the switch 402 is turned on, the reflection board b is grounded to reflect the beam field of the dual-band antenna 102 toward the direction of the reflection board a.

Figure 4E:
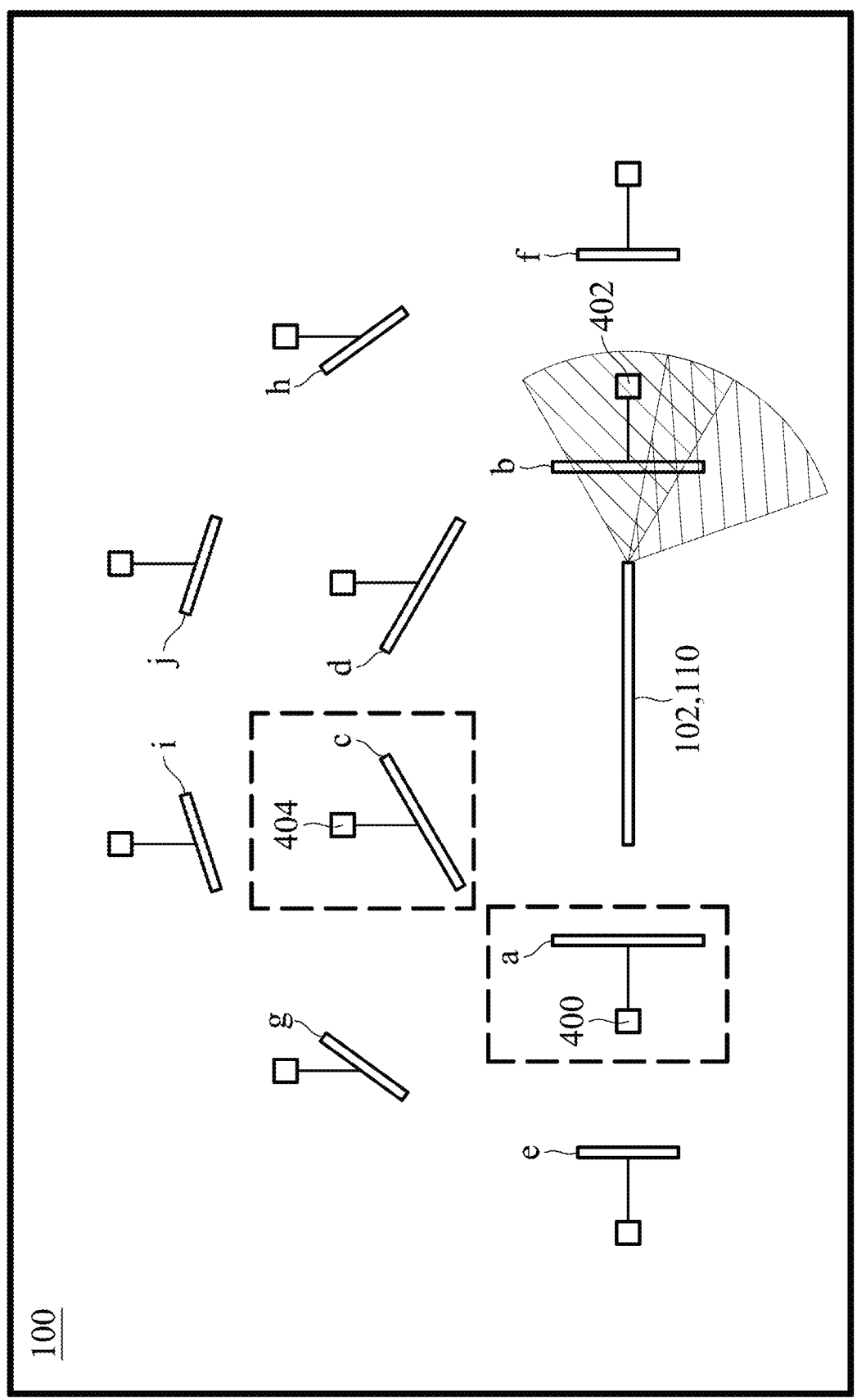
Figure 4F:
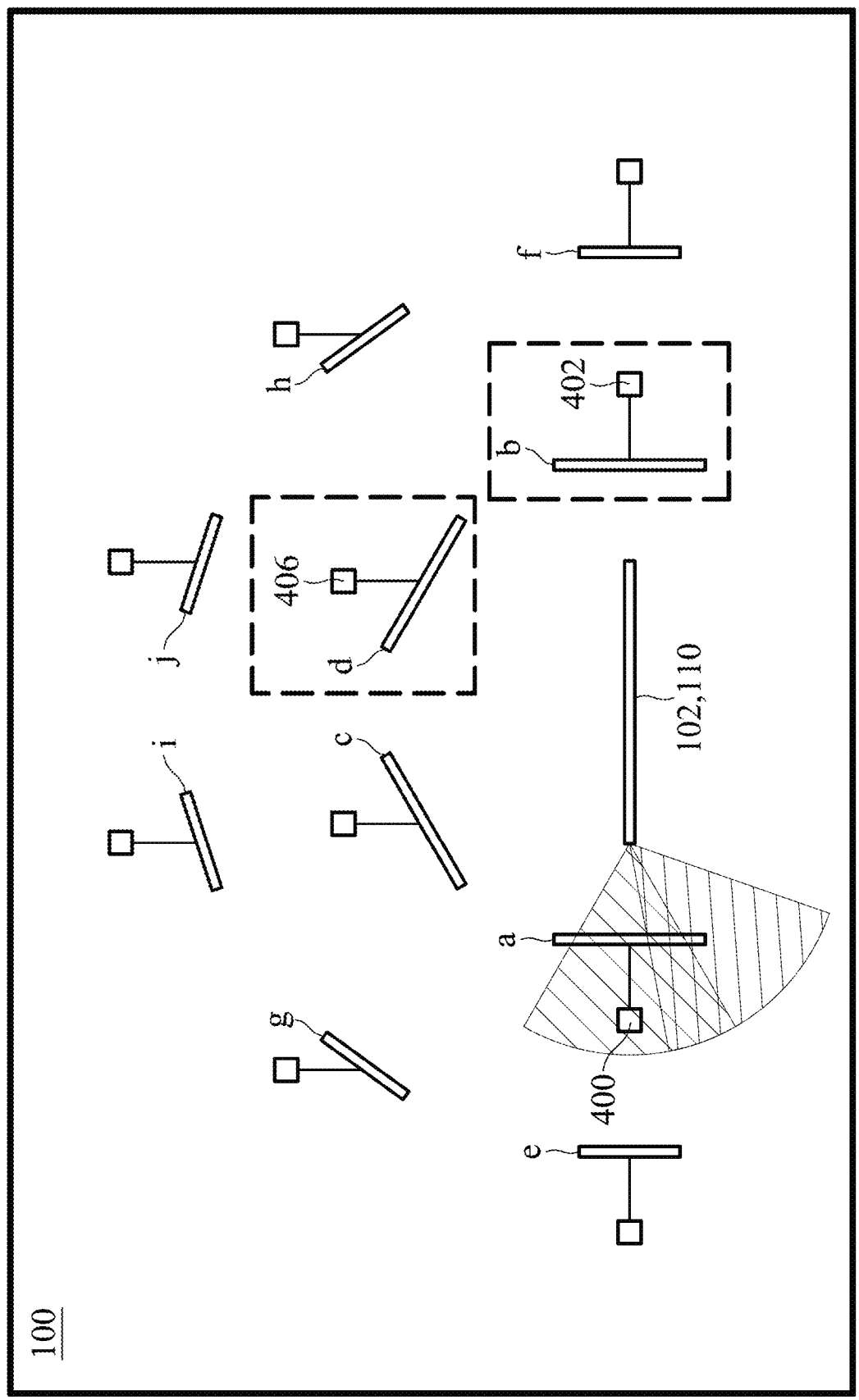

As shown in FIG. 4E, when the switches 400 and 404 are both turned on at the same time, the reflection boards a and c are grounded to reflect the beam field of the dual-band antenna 102 toward the direction of the reflection board b and the direction between the reflection board b and the other side of the baseboard 110 of the dual-band antenna 102. As shown in FIG. 4F, when the switches 402 and 406 are both turned on at the same time, the reflection boards b and d are grounded to reflect the beam field of the dual-band antenna 102 toward the direction of the reflection board a and the direction between the reflection board a and the other side of the baseboard 110 of the dual-band antenna 102.

Figure 4G:
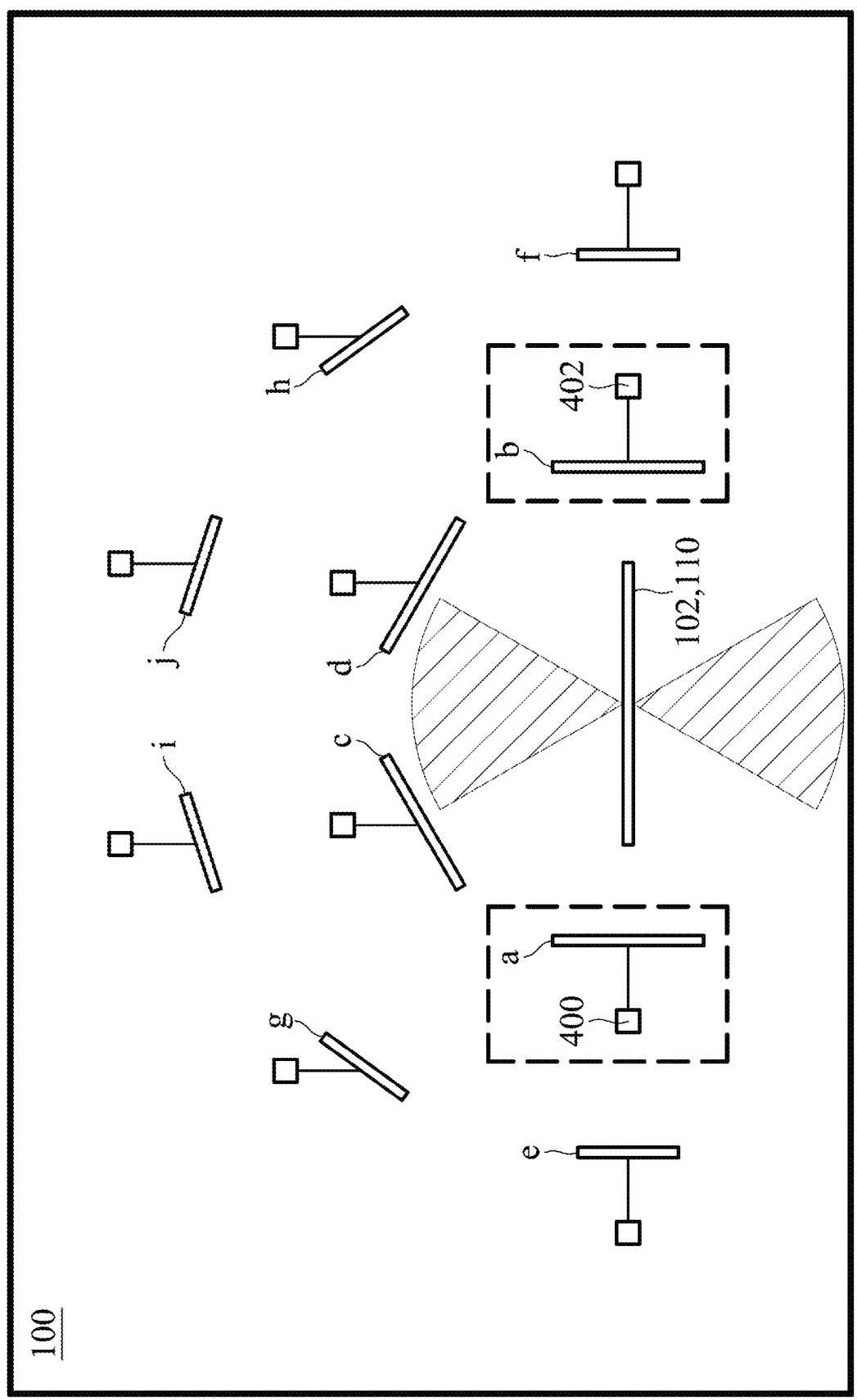

As shown in FIG. 4G, when the switches 400 and 402 are both turned on at the same time, the reflection boards a and b are grounded to reflect the beam field of the dual-band antenna 102 toward the direction of positive and negative plane normal vectors of the baseboard 110 of the frequency antenna 102. Similarly, when the dual-band antenna 102 radiates the signal on the second frequency ($f_2$), the operation of the second reflection unit 106 is the same as that of the first reflection unit 104 in FIGS. 4A-4G, and therefore is not described again.

In the embodiment, the switches 400~418 are respectively a diode, and a controller applies a bias voltage to the switches 400~418 to control whether the switches 400~418 are turned on or off.

Figure 5:
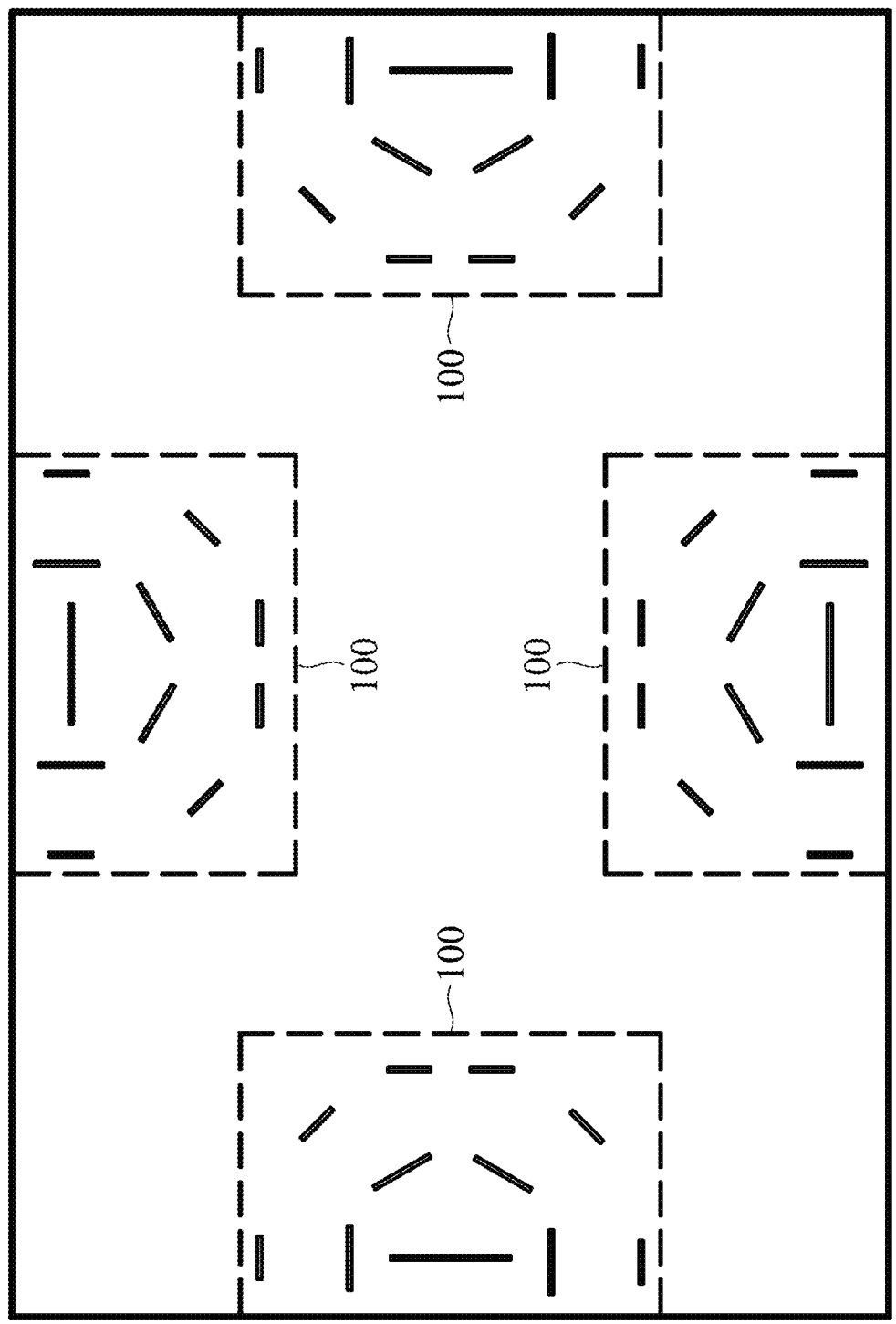
FIG. 5 is schematic diagram of a beam adjustable array antenna including 2×2 beam adjustable antenna device in accordance with other embodiments of the disclosure.

FIG. 5 is schematic diagram of a beam adjustable array antenna including 2×2 beam adjustable antenna device in accordance with other embodiments of the disclosure. As shown in FIG. 5, the beam adjustable array antenna 500 includes four beam adjustable antenna device 100. The number of beam adjustable antenna device 100 included in the beam adjustable array antenna 500 is merely exemplary and is not a limitation of the present invention. The beam adjustable antenna device 100 can generate up to dozens of directional field patterns depending on whether a switch on each of the reflection boards is turned on or off. Furthermore, the beam adjustable array antenna 500 can enhance the directivity of the beam field of the original beam adjustable antenna device 100, and achieve the following advantages: (1) improve the antenna gain and reduce the power consumption for signal transmission; (2) expand the coverage area of the system and reduce the number of router deployments; (3) reduce inter-user interference and increase system capacity; (4) effectively control the beam to improve the efficiency of spectrum use; (5) provide spatial diversity to reduce the impact of multipath fading; (6) improve the quality of the link to achieve high-speed transmission; (7) realize mobile user positioning and provide new telecommunication services.

The ordinal in the specification and the claims of the present invention, such as "first", "second", "third", etc., has no sequential relationship, and is just for distinguishing between two different devices with the same name. In the specification of the present invention, the word "couple" refers to any kind of direct or indirect electronic connection. The present invention is disclosed in the preferred embodiments as described above, however, the breadth and scope of the present invention should not be limited by any of the embodiments described above. Persons skilled in the art can make small changes and retouches without departing from the spirit and scope of the invention. The scope of the invention should be defined in accordance with the following claims and their equivalents.

What is claimed is:

1. A beam adjustable antenna device, comprising:
    a dual-band antenna, radiating or receiving a signal on a first frequency or a second frequency; wherein the first frequency is higher than the second frequency;
    a first reflection unit, having a plurality of first reflection boards to reflect the signal on the first frequency from the dual-band antenna;
    a second reflection unit, having a plurality of second reflection boards to reflect the signal on the second frequency from the dual-band antenna; wherein the first reflection unit is closer to the dual-band antenna than the second reflection unit;
    wherein the plurality of first and second reflection boards are arranged beside the dual-band antenna, and a plane normal vector of each first and second reflection board is directed to the dual-band antenna;
    wherein each of the first and second reflection boards is coupled to a respective switch; when the switch is turned on, one of the first and second reflection boards corresponding to the switch is grounded, so that a beam field of the dual-band antenna corresponding to the first frequency or the second frequency is changed.

2. The beam adjustable antenna device as claimed in claim 1, wherein the dual-band antenna is arranged on a baseboard, the baseboard is arranged between two of the plurality of the first reflection boards, and plane normal vectors of the two of the plurality of the first reflection boards are orthogonal to that of the baseboard; other first reflection boards are arranged on one side of the baseboard.

3. The beam adjustable antenna device as claimed in claim 2, wherein a distance between the two of the plurality of the first reflection boards and the baseboard is one-eighth to one-quarter of a wavelength of the signal on the first frequency.

4. The beam adjustable antenna device as claimed in claim 3, wherein the two of the plurality of the first reflection boards are an a-th reflection board and a b-th reflection board, the other first reflection boards are a c-th reflection board and a d-th reflection board; a distance between a center of each c-th and d-th reflection boards and a first plane extending from the baseboard is one-eighth to one-quarter of the wavelength of the signal on the first frequency.

5. The beam adjustable antenna device as claimed in claim 4, wherein an angle between a plane normal vector of the c-th reflection board and the first plane is under a range of 55 to 65 degrees, and an angle between a plane normal vector of the d-th reflection board and the first plane is under a range of 115 to 125 degrees.

6. The beam adjustable antenna device as claimed in claim 2, wherein the baseboard and the two of the plurality of the first reflection boards are arranged between two of the plurality of the second reflection boards, and plane normal vectors of the two of the plurality of the second reflection boards are orthogonal to that of the baseboard, and the other second reflection boards are arranged on one side of the baseboard.

7. The beam adjustable antenna device as claimed in claim 6, wherein a distance between the two of the plurality of the second reflection boards and the baseboard is one-eighth to one-quarter of a wavelength of the signal on the second frequency.

8. The beam adjustable antenna device as claimed in claim 7, wherein the two of the plurality of the second reflection boards are an e-th reflection board and an f-th reflection board, and the other second reflection boards are a g-th reflection board, an h-th reflection board, an i-th reflection board, and a j-th reflection board; a distance between a center of each g-th, h-th, i-th, and j-th reflection boards and a first plane extending from the baseboard is one-eighth to one-quarter of the wavelength of the signal on the second frequency.

9. The beam adjustable antenna device as claimed in claim 8, wherein an angle between a plane normal vector of the g-th reflection board and the first plane is under a range of 45 to 55 degrees, and an angle between a plane normal vector of the h-th reflection board and the first plane is under a range of 125 to 135 degrees, and an angle between a plane normal vector of the i-th reflection board and the first plane is under a range of 78 to 88 degrees; and an angle between a plane normal vector of the j-th reflection board and the first plane is under a range of 92 to 102 degrees.

10. The beam adjustable antenna device as claimed in claim 1, wherein the dual-band antenna comprises an inverted-F antenna (PIFA), a loop antenna, and an open loop antenna.

11. The beam adjustable antenna device as claimed in claim 1, wherein the dual-band antenna comprises a radiation part for the first frequency and a radiation part for the second frequency, and is orthogonal to a second plane; a height from the radiation part for the second frequency to the second plane is greater than a height from the radiation part for the first frequency to the second plane.

12. The beam adjustable antenna device as claimed in claim 11, wherein the first and second reflection units are both orthogonal to the second plane; a height of the first reflection unit to the second plane is identical to the height from the radiation part for the first frequency to the second plane; a height of the second reflection unit to the second plane is identical to the height from the radiation part for the second frequency to the second plane.

* * * * *